United States Patent
Annamalai et al.

(10) Patent No.: US 11,885,397 B1
(45) Date of Patent: Jan. 30, 2024

(54) DAMPER ASSEMBLY COVER PLATE

(71) Applicant: Schaeffler Technologies AG & Co. KG, Herzogenaurach (DE)

(72) Inventors: Subramanian Annamalai, Strongsville, OH (US); Kyle Nelson, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/954,439

(22) Filed: Sep. 28, 2022

(51) Int. Cl.
*F16H 45/02* (2006.01)
*F16F 15/121* (2006.01)
*F16F 15/123* (2006.01)

(52) U.S. Cl.
CPC .......... *F16H 45/02* (2013.01); *F16F 15/1216* (2013.01); *F16F 15/1234* (2013.01); *F16H 2045/0221* (2013.01); *F16H 2045/0284* (2013.01)

(58) Field of Classification Search
CPC ... F16H 45/02; F16H 2045/0273–0294; F16H 2045/0221–0231; F16F 15/1213; F16F 15/1216; F16F 15/1234; F16F 15/12353–12373
See application file for complete search history.

(56) References Cited

U.S. PATENT DOCUMENTS

| | | | |
|---|---|---|---|
| 8,708,118 B2 * | 4/2014 | Steinberger | F16H 45/02 192/55.61 |
| 9,709,127 B2 * | 7/2017 | Takikawa | F16F 15/145 |
| 9,939,057 B2 * | 4/2018 | Lee | F16F 15/123 |
| 9,989,136 B2 * | 6/2018 | Takikawa | F16F 15/14 |
| 10,352,423 B2 * | 7/2019 | Cai | F16H 45/02 |
| 10,808,820 B2 * | 10/2020 | Sung | F16D 13/683 |
| 2021/0140525 A1 * | 5/2021 | Adams | H02K 11/225 |
| 2021/0242750 A1 * | 8/2021 | Satyaseelan | B60K 6/485 |

FOREIGN PATENT DOCUMENTS

| | | | |
|---|---|---|---|
| DE | 102019113900 A1 | | 12/2019 |
| JP | 2007113660 A | * | 5/2007 |
| KR | 100794266 B1 | * | 1/2008 |
| WO | WO-2021101110 A1 | * | 5/2021 |

* cited by examiner

*Primary Examiner* — David R Morris
*Assistant Examiner* — James J Taylor, II

(57) ABSTRACT

A torque converter includes a front cover, an impeller, a turbine, a lock-up clutch, and a damper assembly. The front cover is arranged to receive a torque. The impeller has an impeller shell non-rotatably connected to the cover. The turbine is in fluid communication with the impeller and includes a turbine shell. The lock-up clutch includes a clutch plate. The damper assembly includes a spring and a cover plate supporting the spring. The cover plate includes a spring window configured to receive the spring, and a plurality of tabs extending from a radial side of the spring window towards the front cover. The plurality of tabs are configured to drivingly connect to the clutch plate.

20 Claims, 3 Drawing Sheets

DAMPER ASSEMBLY COVER PLATE

TECHNICAL FIELD

The present disclosure relates generally to a damper assembly for a torque converter, and more specifically to a cover plate for a damper assembly and a torque converter including the damper assembly.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a case of the torque converter to bypass the fluid coupling. Due to limited spacing within a torque converter envelope, it is desirable to have alternative designs and configurations to fit all the necessary components within the torque converter while still meeting durability and performance requirements.

SUMMARY

Embodiments of the present disclosure provide a torque converter including a front cover, an impeller, a turbine, a lock-up clutch, and a damper assembly. The front cover is arranged to receive a torque. The impeller has an impeller shell non-rotatably connected to the cover. The turbine is in fluid communication with the impeller and includes a turbine shell. The lock-up clutch includes a clutch plate. The damper assembly includes a spring and a cover plate supporting the spring. The cover plate includes a spring window configured to receive the spring, and a plurality of tabs extending from a radial side of the spring window towards the front cover. The plurality of tabs are configured to drivingly connect to the clutch plate.

In embodiments, the plurality of tabs may be integral with the radial side of the spring window. In embodiments, the plurality of tabs may be circumferentially spaced from each other. In embodiments, the plurality of tabs may be uniformly spaced from each other within the spring window.

In embodiments, the damper assembly may include a second spring circumferentially aligned with the spring. The spring window may be configured to receive the second spring. In embodiments, each tab may include a radial portion and an axial portion extending axially therefrom. The radial portion may extend radially from the radial side and may be configured to axially retain the spring within the spring window. The axial portion may be configured to drivingly connect to the clutch pack.

In embodiments, the lock-up clutch may include a reaction plate disposed between the front cover and the turbine shell and a piston axially slidable to compress the clutch plate against the reaction plate. The clutch plate may be drivingly connected with the plurality of tabs radially inside of the reaction plate. The lock-up clutch may include a second clutch plate axially spaced from the clutch plate and drivingly connected with the plurality of tabs, and an intermediate clutch plate disposed between the clutch plate and the second clutch plate and engaged with the reaction plate. The clutch plate and the second clutch plate may be drivingly connected with the plurality of tabs radially inside of the reaction plate. The intermediate clutch plate may be engaged with the reaction plate radially outside of the clutch plate and the second clutch plate. A portion of the reaction plate may be radially aligned with a portion of the cover plate.

Embodiments of the present disclosure further provide a damper assembly for a torque converter. The damper assembly includes a spring and a cover plate supporting the spring. The cover plate includes a spring window configured to receive the spring, and a plurality of tabs extending from a radial side of the spring window away from the spring. The plurality of tabs are configured to drivingly connect to a lock-up clutch.

In embodiments, the plurality of tabs may be integral with the radial side of the spring window. In embodiments, the plurality of tabs may be circumferentially spaced from each other. In embodiments, the plurality of tabs may be uniformly spaced from each other within the spring window. In embodiments, the damper assembly may include a second spring circumferentially aligned with the spring. The spring window may be configured to receive the second spring.

In embodiments, each tab may include a radial portion and an axial portion extending axially therefrom. The radial portion may extend radially from the radial side and may be configured to axially retain the spring within the spring window. The axial portion may be configured to drivingly connect to the lock-up clutch.

Instead of having a separate component connected to the cover plate and configured to engage the lock-up clutch, embodiments described herein provide a damper assembly having a cover plate with a plurality of tabs configured to engage the lock-up clutch. This allows the damper assembly to be driven directly with the clutch without additional components fastened to the cover plate, which can reduce costs and complexity of the damper assembly.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
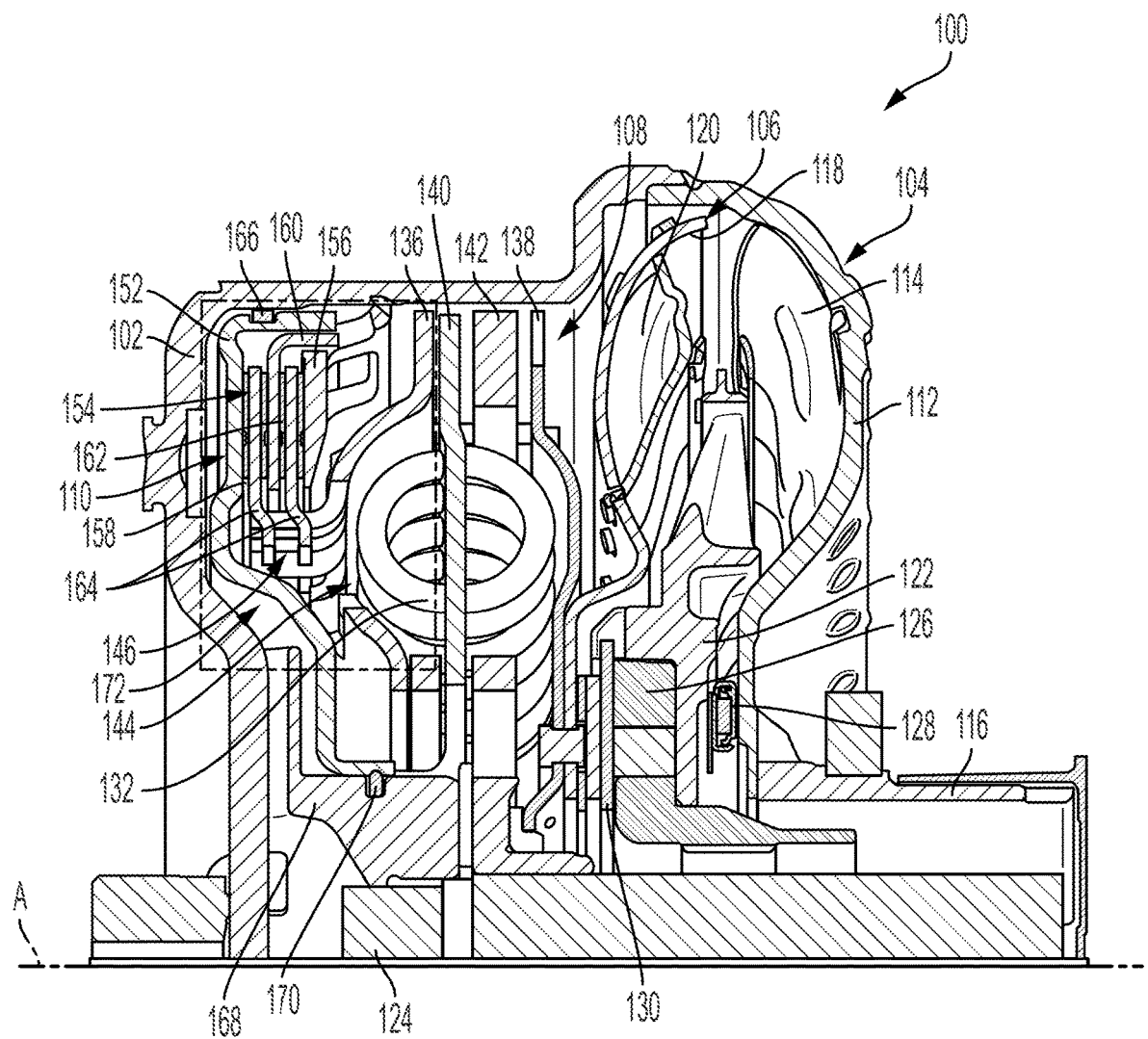
FIG. 1 a cross-sectional view of a torque converter according to the present disclosure.
Figure 2:
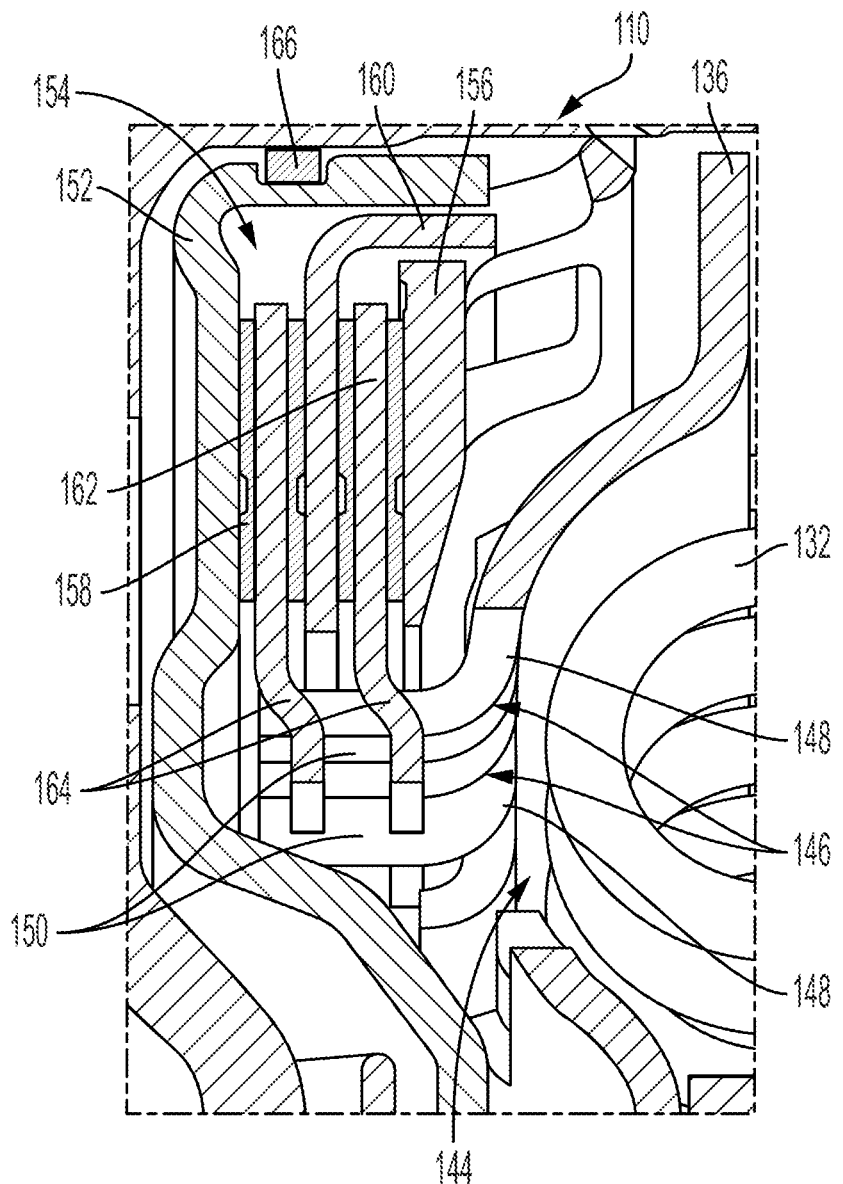
FIG. 2 illustrates an enlarged view of an area of the torque converter shown in FIG. 1.

Referring to FIGS. 1-2, a portion of a torque converter 100 is illustrated according to one embodiment of the present disclosure. At least some portions of the torque converter 100 are rotatable about a central axis A. While only a portion of the torque converter 100 above the central axis A is shown in FIG. 1, it should be understood that the torque converter 100 can appear substantially similar below the central axis A with many components extending about the central axis A. Words such as "axial," "radial," "circumferential," "outward," etc. as used herein are intended to be with respect to the central axis A.

The torque converter 100 includes: a front cover 102 arranged to receive torque; an impeller assembly 104; a turbine assembly 106; a damper assembly 108; and a lock-up clutch assembly 110. The impeller assembly 104 includes: an impeller shell 112 non-rotatably connected to the front cover 102; at least one impeller blade 114 attached to an inner surface of the impeller shell 112; and an impeller hub 116 fixed to a radially inner end of the impeller shell 112. The turbine assembly 106 includes: a turbine shell 118; and at least one turbine blade 120 attached to the turbine shell 118. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

Torque converter 100 may include: a stator 122 disposed axially between the impeller assembly 104 and the turbine assembly 106 to redirect fluid flowing from the turbine blade 120 before the fluid reaches the impeller assembly 104 to increase an efficiency of the torque converter 100. For example, the impeller blade 114, when rotated about the central axis A, pushes the fluid outwardly. The fluid pushes against the turbine assembly 106 of the torque converter 100, causing the turbine assembly 106 to revolve about the central axis A. The stator 122 functions to return the fluid from the turbine assembly 106 back to the impeller assembly 104 with minimal or no power loss. Drive power is transmitted from the turbine assembly 106 to a transmission input shaft 124. The torque converter 100 may, for example, further include: a one-way clutch 126 disposed within the stator 122, a thrust bearing 128 disposed axially between the stator 122 and the impeller shell 112, and a side plate 130 configured to retain the one-way clutch 126 within the stator 122.

The damper assembly 108 is positioned axially between the front cover 102 and the turbine assembly 106 and is configured to transfer torque from the front cover 102 to the transmission input shaft 124. The damper assembly 108 includes: a spring 132; cover plates 136, 138; and a hub flange 142.

The cover plate 136 may support the spring 132 on one axial side. The cover plate 138 may support the spring 132 on another, opposite axial side. The cover plates 136, 138 may be connected to each other, for example, via a rivet, radially outward of springs 132, 134. The cover plate 136 may be connected to the lock-up clutch assembly 110 (as discussed further below), and the cover plate 138 may be connected to the turbine shell 118. That is, the cover plates 136, 138 are arranged to act as an input to the damper assembly 108.

Figure 3:
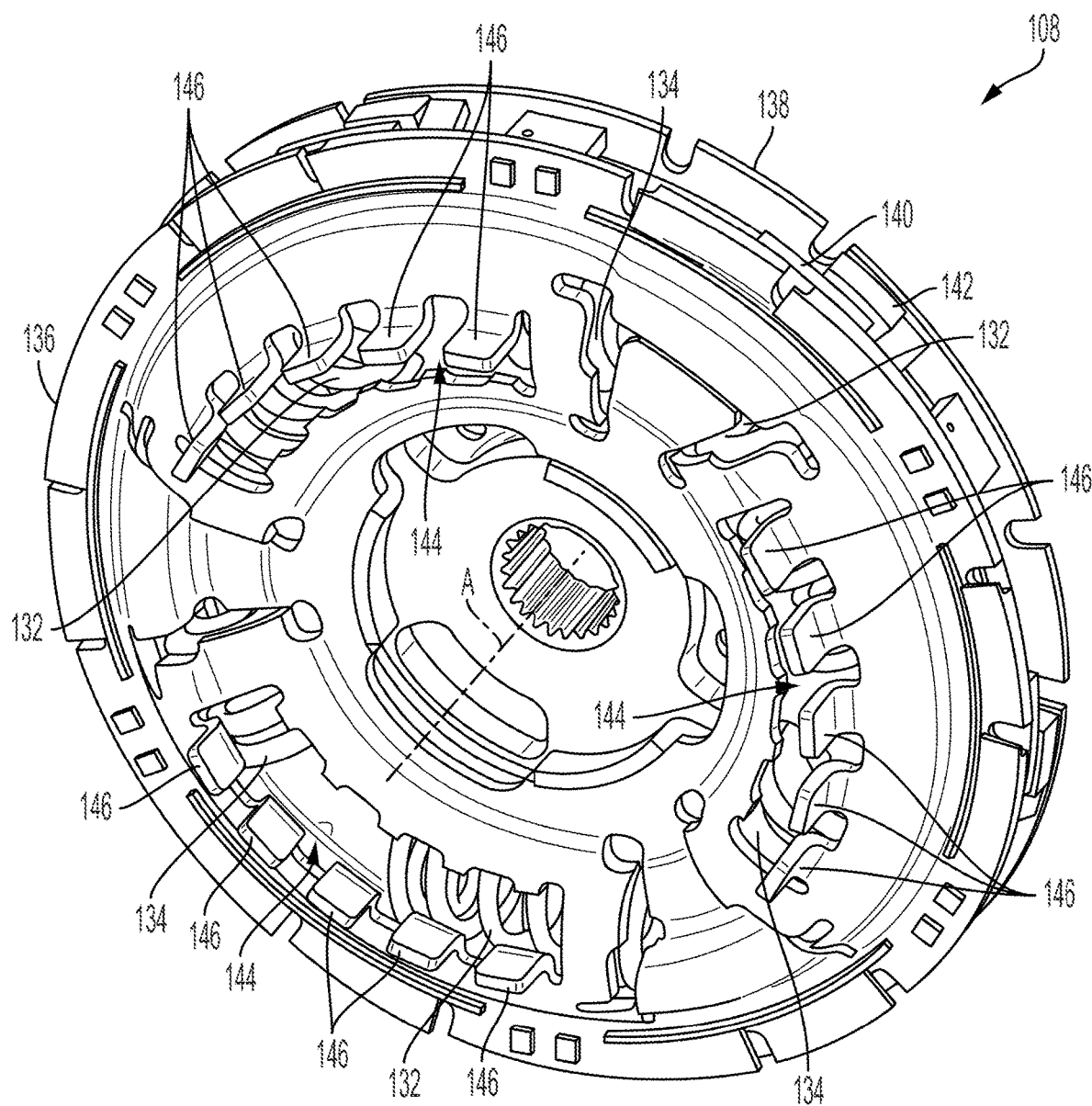
FIG. 3 illustrates a perspective view of a damper assembly according to the present disclosure.

The cover plates 136, 138 may define a spring window 144 extending partially circumferentially about the central axis A. The spring window 144 may be configured to receive the spring 132. The spring window 144 may be further configured to receive a further spring 134, as shown in FIG. 3. In such an example, the springs 132, 134 may be circumferentially spaced from each other in the spring window 144. The spring 132 may have a different spring rate than the further spring 134. For example, the spring rate of the spring 132 may be greater than the spring rate of the further spring 134.

The damper assembly 108 may further include an intermediate flange 140 disposed axially between the cover plates 136, 138, and, specifically, between the hub flange 142 and the cover plate 136. That is, the hub flange 142 is disposed axially between the intermediate flange 140 and the cover plate 138. The hub flange 142 and the intermediate flange 140 may each engage with the springs 132, 134 to transmit torque through the damper assembly 108. For example, the intermediate flange 140 and the hub flange 142 may each define a plurality of slots (not numbered) circumferentially spaced from each other. The slots in the intermediate flange 140 may be circumferentially offset relative to the slots in the hub flange 142 such that one slot of the intermediate flange 140 defines a first opening (not numbered) with one slot of the hub flange 142 and a second opening (not numbered) with another slot of the hub flange 142. The first opening may be configured to receive the spring 132, and the second opening may be configured to receive the further spring 134. The intermediate flange 140 and the hub flange 142 may be configured to rotate relative to each other to transmit torque through the damper assembly 108 such that the spring 132 and/or the further spring 134 are compressed in the respective opening. The hub flange 142 is connected to transmission input shaft 124 for torque transmission therebetween.

The cover plate 136 includes a plurality of tabs 146 extending from a radial side of the spring window 144 towards the front cover 102, i.e., away from the springs 132, 134. The plurality of tabs 146 may be integral with the radial side of the spring window 144. For example, the cover plate 136 including the spring window 144 and the plurality of tabs 146 may be formed by stamping and then machined for desired finished surfaces. The plurality of tabs 146 may circumferentially spaced from each other. The plurality of tabs 146 may be uniformly spaced from each other within the spring window 144. The cover plate 136 may include any suitable number of tabs 146. The tabs 146 are configured to transmit a torque from the lock-up clutch assembly 110 to the damper assembly 108.

Each tab 146 may include a radial portion 148 extending radially away from the radial side. For example, the plurality of tabs 146 may be arranged on an outer radial side of the spring window 144. In such an example, the radial portion 148 may extend radially inward from the outer radial side. As another example, the plurality of tabs 146 may be arranged on an inner radial side of the spring window 144. In such an example, the radial portion 148 may extend radially outward from the inner radial side. The radial portion 148 may be configured to retain the first and second springs 132, 134 axially within the spring window 144.

Each tab 146 may further include an axial portion 150 extending axially away from the radial portion 148. The axial portion 150 may extend towards the front cover 102. The axial portion 150 may be configured to drivingly connect to the lock-up clutch assembly 110, as discussed further below.

The lock-up clutch assembly 110 is configured to selectively transfer torque from the front cover 102 to the transmission input shaft 124. The lock-up clutch assembly 110 includes a piston 152, a clutch pack 154, and a reaction plate 156. The reaction plate 156 may be fixed to the front cover 102 via a weld, for example. The reaction plate 156 may be, at least partially, radially aligned with the cover plate 136. That is, a line extending from the central axis A and orthogonal to the central axis A may extend through the cover plate 136 and then the reaction plate 156. Radially aligning the reaction plate 156 with the cover plate 136 can reduce the envelop of the torque converter 100.

The clutch pack 154 is disposed between the reaction plate 156 and the piston 152 and connected to the cover plate 136 of the damper assembly 108. The clutch pack 154 may include a clutch plate 158, a clutch plate 160, and a clutch plate 162.

The clutch plate 158 and the clutch plate 162 may be axially spaced from each other and directly connected to an input of the damper assembly 108. For example, the clutch plates 158, 162 each may be drivingly connected to the cover plate 136 to transfer torque thereto, e.g., via a tabbed connection. For example, the clutch plates 158, 162 each may include a plurality of tabs 164 circumferentially spaced from each other. The plurality of tabs 164 of the clutch plates 158, 162 may be configured to engage the plurality of tabs 146 of the cover plate 136. That is, the plurality of tabs 164 may be arranged to be received between circumferentially adjacent tabs 146 of the cover plate 136. For example, the plurality of tabs 164 of the clutch plates 158, 162 may extend radially inside of the plurality of tabs 146 of the cover plate 136. The tabs 146, 164 may engage each other radially inside of the reaction plate 156. The tabs 146, 164 engage with each other such that the cover plate 136 rotates when the clutch plates 158, 162 rotate.

The clutch plate 160 may be disposed axially between the clutch plates 158, 162. The clutch plate 160 may be supported by the reaction plate 156. For example, the clutch plate 160 may be engaged with the reaction plate 156, e.g., via a tabbed connection, radially outside of the clutch plates 158, 162. Friction paper or rings (not numbered) may further be attached to the clutch plate 158, the clutch plate 160, the clutch plate 162, the reaction plate 156, and/or the piston 152. For example, friction materials (facings) may be attached to the clutch plates 158, 162 and clutch plate 160 may act as friction surface for the friction facings.

The piston 152 is axially slidable to compress the clutch pack 154 against the reaction plate 156. The piston 152 may be disposed axially between the front cover 102 and the clutch pack 154 and configured to be sealed to the front cover 102 at an outer end thereof via a seal 166 and sealed to a hub 168 at an inner end thereof via a seal 170. The piston 152 may further be connected to the front cover 102 via a leaf-spring connection that allows axial displacement of the piston 152 in a first axial direction AD1 and a second axial direction AD2 for selective engagement of the lock-up clutch assembly 110.

During axial movement of the piston 152, the piston 152 slides along the hub 168. The piston 152 closes the lock-up clutch assembly 110 in response to pressurization of a medium (e.g., fluid such as oil) in a piston apply chamber 172 defined between the front cover 102 and the piston 152. Seals 166, 170 maintain a fluid separation between the piston apply chamber 172 and the rest of the torque converter 1000. The piston apply chamber 172 is further defined by, or bounded between, the front cover 102, the hub 168, the seal 166, the piston 152, and the seal 170. By "bounded in part," we mean that a portion of the cited chamber, flow path, or other structure is bounded, or formed, by the cited element.

According to embodiments disclosed herein, a torque path goes from the piston 152 and the reaction plate 156 to the clutch pack 154. However, instead of having a tabbed connection to another component connected to the cover plate 136, the tabs 164 on the clutch plates 158, 162 interact directly with the tabs 146 on the cover plate 136. That is, the tabs 146, 164 are configured to engage with each other, which allows torque to be transmitted directly through the interface. The clutch pack 154 then directly drives the cover plate 136.

Embodiments according to the present disclosure provide various advantages including providing a plurality of tabs extending from a spring window on a cover plate for a damper assembly to directly drive the damper assembly with a lock-up clutch without any additional components and/or fasteners, which can reduce costs and complexity of the damper assembly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 impeller assembly
106 turbine assembly
108 damper assembly
110 lock-up clutch assembly
112 impeller shell
114 impeller blade
116 impeller hub
118 turbine shell
120 turbine blade 122 stator
124 transmission input shaft
126 one-way clutch
128 thrust bearing
130 side plate
132 spring
134 spring
136 cover plate
138 cover plate
140 intermediate flange
142 hub flange
144 spring window
146 tabs
148 radial portion
150 axial portion
152 piston
154 clutch pack
156 reaction plate
158 clutch plate
160 clutch plate
162 clutch plate
164 tabs
166 seal
168 hub
170 seal
172 apply chamber
A central axis
AD1 axial direction
AD2 axial direction

What is claimed is:

1. A torque converter, comprising:
a front cover arranged to receive a torque;
an impeller having an impeller shell non-rotatably connected to the front cover;
a turbine in fluid communication with the impeller and including a turbine shell;
a lock-up clutch including a clutch plate; and
a damper assembly including a spring and a cover plate supporting the spring, the cover plate including:
a spring window configured to receive the spring; and
a plurality of tabs each including a radial portion extending from a radial side of the spring window radially into the spring window and an axial portion extending from the radial portion and towards the front cover, the plurality of tabs being configured to drivingly connect to the clutch plate.

2. The torque converter of claim 1, wherein the plurality of tabs are integral with the radial side of the spring window.

3. The torque converter of claim 1, wherein the plurality of tabs are circumferentially spaced from each other.

4. The torque converter of claim 1, wherein the plurality of tabs are uniformly spaced from each other within the spring window.

5. The torque converter of claim 1, wherein the damper assembly includes a second spring circumferentially aligned with the spring, the spring window being configured to receive the second spring.

6. The torque converter of claim 1, wherein the radial portion is configured to axially retain the spring within the spring window.

7. The torque converter of claim 6, wherein the axial portion is configured to drivingly connect to the clutch plate.

8. The torque converter of claim 1, wherein the lock-up clutch includes a reaction plate disposed between the front cover and the turbine shell and a piston axially slidable to compress the clutch plate against the reaction plate.

9. The torque converter of claim 8, wherein the clutch plate is drivingly connected with the plurality of tabs radially inside of the reaction plate.

10. The torque converter of claim 8, wherein the lock-up clutch includes a second clutch plate axially spaced from the clutch plate and drivingly connected with the plurality of tabs, and an intermediate clutch plate disposed between the clutch plate and the second clutch plate and engaged with the reaction plate via a tabbed connection.

11. The torque converter of claim 10, wherein the clutch plate and the second clutch plate are drivingly connected with the plurality of tabs radially inside of the reaction plate.

12. The torque converter of claim 10, wherein the intermediate clutch plate is engaged with the reaction plate radially outside of the clutch plate and the second clutch plate.

13. The torque converter of claim 8, wherein a portion of the reaction plate is radially aligned with a portion of the cover plate.

14. A damper assembly for a torque converter, comprising:
a spring;
a cover plate supporting the spring, the cover plate including:
a spring window configured to receive the spring; and
a plurality of tabs each including a radial portion extending from a radial side of the spring window radially into the spring window and an axial portion extending from the radial portion and away from the spring, the plurality of tabs being configured to drivingly connect to a lock-up clutch.

15. The damper assembly of claim 14, wherein the plurality of tabs are integral with the radial side of the spring window.

16. The damper assembly of claim 14, wherein the plurality of tabs are circumferentially spaced from each other.

17. The damper assembly of claim 14, wherein the plurality of tabs are uniformly spaced from each other within the spring window.

18. The damper assembly of claim 14, wherein the damper assembly includes a second spring circumferentially aligned with the spring, the spring window being configured to receive the second spring.

19. The damper assembly of claim 14, wherein the radial portion is configured to axially retain the spring within the spring window, and the axial portion is configured to drivingly connect to the lock-up clutch.

20. A damper assembly for a torque converter, comprising:
a spring;
a cover plate supporting the spring, the cover plate including:
a spring window configured to receive the spring; and
a plurality of tabs extending from a radial side of the spring window away from the spring, the plurality of tabs being configured to drivingly connect to a lock-up clutch;
wherein the plurality of tabs are uniformly spaced from each other within the spring window.

* * * * *